(12) United States Patent
Cho et al.

(10) Patent No.: US 12,481,769 B2
(45) Date of Patent: Nov. 25, 2025

(54) MEMORY SYSTEM, MEMORY CONTROLLER AND OPERATION METHOD THEREOF FOR ENCRYPTING DATA STORED IN A NONVOLATILE MEMORY

(71) Applicant: SK hynix Inc., Gyeonggi-do (KR)

(72) Inventors: Seung Duk Cho, Gyeonggi-do (KR); Woo Tae Chang, Gyeonggi-do (KR); Gi Jo Jeong, Gyeonggi-do (KR); Jung Hyun Joh, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 120 days.

(21) Appl. No.: 18/096,561

(22) Filed: Jan. 13, 2023

(65) Prior Publication Data

US 2024/0078322 A1 Mar. 7, 2024

(30) Foreign Application Priority Data

Sep. 6, 2022 (KR) .................. 10-2022-0112923

(51) Int. Cl.
*G06F 21/60* (2013.01)
*G06F 21/78* (2013.01)

(52) U.S. Cl.
CPC ............ *G06F 21/602* (2013.01); *G06F 21/78* (2013.01)

(58) Field of Classification Search
CPC ........ G06F 21/602; G06F 21/78; G06F 3/062; G06F 3/0658; G06F 3/0623; G06F 3/0659
See application file for complete search history.

(56) References Cited

U.S. PATENT DOCUMENTS

| | | | | |
|---|---|---|---|---|
| 7,526,085 | B1 * | 4/2009 | Bong | H04L 63/061 380/37 |
| 9,223,612 | B1 * | 12/2015 | Feldman | G06F 3/0652 |
| 10,873,454 | B2 * | 12/2020 | Murray | H04L 63/20 |
| 2007/0165864 | A1 * | 7/2007 | Nagase | G06F 21/602 380/284 |
| 2009/0296937 | A1 * | 12/2009 | Suu | H04L 9/0822 713/193 |
| 2010/0153747 | A1 * | 6/2010 | Asnaashari | H04L 9/0637 713/193 |
| 2013/0223628 | A1 * | 8/2013 | Cho | H04L 9/0861 380/277 |
| 2013/0290736 | A1 * | 10/2013 | Kudoh | H04L 9/10 713/189 |

(Continued)

OTHER PUBLICATIONS

Frederick Knight et al., TCG SSC: Key Per IO, Feb. 2020, pp. 1-24, NetApp, Inc.

*Primary Examiner* — Jimmy H Tran
(74) *Attorney, Agent, or Firm* — IP & T GROUP LLP (57) ABSTRACT

The present disclosure relates to a memory system capable of encrypting and storing data, and a memory controller. The memory controller may include a first interface configured to perform data communication with a first external device, a second interface configured to generate a signal for controlling an operation of a second external device and transmit the signal; and a processor configured to receive, from the first external device, a data write command to write data to the second external device, encrypt the data by using one of a plurality of keys stored in a key area provided in the first external device in response to the data write command, and then control the encrypted data to be written to the second external device.

20 Claims, 5 Drawing Sheets

(56) References Cited

U.S. PATENT DOCUMENTS

| | | | |
|---|---|---|---|
| 2015/0074329 A1* | 3/2015 | Kondo | G06F 12/1408 |
| | | | 711/163 |
| 2018/0260151 A1* | 9/2018 | Hsu | G06F 21/6218 |
| 2019/0266103 A1 | 8/2019 | Pearson et al. | |
| 2019/0362081 A1* | 11/2019 | Kanno | G06F 21/602 |
| 2020/0026883 A1* | 1/2020 | de Almeida | H04L 9/0637 |
| 2020/0065528 A1* | 2/2020 | Ogawa | G06F 3/0622 |
| 2020/0133566 A1* | 4/2020 | Kim | G06F 3/0679 |
| 2020/0134208 A1* | 4/2020 | Pappachan | G06F 21/78 |
| 2020/0150895 A1* | 5/2020 | Kim | G06F 3/0679 |
| 2020/0186340 A1 | 6/2020 | Du et al. | |
| 2020/0244458 A1* | 7/2020 | Kanbe | G06F 3/0637 |
| 2020/0293676 A1* | 9/2020 | Hara | G06F 21/79 |
| 2021/0073404 A1* | 3/2021 | Sakata | G06F 3/0623 |
| 2021/0257034 A1* | 8/2021 | Lee | G06F 3/064 |
| 2021/0319143 A1* | 10/2021 | Chhabra | H04L 9/3242 |
| 2021/0367777 A1* | 11/2021 | Benisty | G06F 21/85 |
| 2022/0029793 A1* | 1/2022 | Kachare | G06F 13/1668 |
| 2022/0045850 A1* | 2/2022 | Ejiri | G06F 13/1668 |
| 2022/0283714 A1* | 9/2022 | Lee | G06F 3/0622 |
| 2022/0284135 A1* | 9/2022 | Hubis | G06F 21/79 |
| 2023/0071555 A1* | 3/2023 | Ogawa | G06F 21/604 |
| 2023/0141861 A1* | 5/2023 | Shin | G06F 12/1408 |
| 2023/0152988 A1* | 5/2023 | Lee | G06F 3/0637 |
| | | | 711/154 |
| 2023/0384971 A1* | 11/2023 | Hahn | G06F 3/0607 |

* cited by examiner

MEMORY SYSTEM, MEMORY CONTROLLER AND OPERATION METHOD THEREOF FOR ENCRYPTING DATA STORED IN A NONVOLATILE MEMORY

CROSS-REFERENCE TO RELATED APPLICATIONS

The present application claims the benefit 35 U.S.C. 119(a) of Korea Patent Application No. 10-2022-0112923, filed Sep. 6, 2022 the entire contents of which is incorporated herein for all purposes by this reference.

FIELD

Various embodiments of the present disclosure relate to a memory system, a memory controller, and operation methods thereof, and particularly to a method for encrypting data stored in a nonvolatile memory.

BACKGROUND

Recently, the use of portable electronic devices such as a mobile phone, a tablet PC, a black box, a laptop, etc., is expanding rapidly. For the purpose of meeting device constraints, for example, the weight, size, etc., of the portable electronic device, a non-volatile memory system is generally used rather than a magnetic disk type storage used in a computer. Compared to the magnetic disc type storage, the non-volatile memory system has excellent safety and durability due to no mechanical driving part, very high data writing and reading speed, and has a lower power consumption.

While a non-volatile memory system has an advantage that stored data is not lost even when power is not applied, the contents of the data are very highly likely to be leaked. Therefore, a self-encrypting drive (SED) has been developed as a method for supporting a security and trust service for the non-volatile memory system. The self-encrypting drive is obtained by causing an encryption hardware to be built into a drive controller. The self-encrypting drive automatically encrypts all of the data when performing a write operation to a non-volatile memory and decrypts when performing a read operation from the non-volatile memory.

An NVMe Working Group, which is developing a non-volatile memory express (NVMe) standard, proposes a Key Per JO (KPIO) standard in order to enhance the security of the non-volatile memory.

An existing self-encrypting drive encrypts and decrypts all of the data by using a single key generated by the drive itself. However, the KPIO proposes to obtain a plurality of keys for encryption and decryption from an external server, and to encrypt and decrypt data by using the plurality of keys.

In order to implement a non-volatile memory system according to such a KPIO standard, a volatile memory that must store a key for encryption and decryption is required, and according to the KPIO standard, a volatile memory up to 1 GB may be required.

It is inefficient to provide 1 GB volatile memory in the non-volatile memory system. Also, when a DRAM is used as a memory for storing a key, it takes time to find the key and to access the DRAM to obtain the key, resulting in performance degradation.

SUMMARY

Various embodiments of the present disclosure recognize the above-described concerns and provide a non-volatile memory system that does not require a large-capacity volatile memory for storing a key according to the KPIO standard.

Also, various embodiments of the present disclosure provide a method of a controller for obtaining an encryption key in order to efficiently encrypt and decrypt data in a non-volatile memory system which is not equipped with a large-capacity volatile memory for storing a key according to the KPIO standard.

The technical concerns to be overcome in this disclosure is not limited to those above-mentioned. Other technical concerns not mentioned can be clearly understood from those described below by a person having ordinary skill in the art.

An embodiment of the present disclosure is a memory controller including a first interface configured to perform data communication with a first external device, a second interface configured to generate a signal for controlling an operation of a second external device and transmit the signal; and a processor configured to receive, from the first external device, a data write command to write data to the second external device, encrypt the data by using one of a plurality of keys stored in a key area provided in the first external device in response to the data write command, and then control the encrypted data to be written to the second external device.

Another embodiment of the present disclosure is a memory system including a memory device configured to store encrypted data and a memory controller configured to receive, from a first external device, a data write command to write data to the memory device, encrypt the data by using one of a plurality of keys stored in a key area provided in the first external device in response to the data write command, and then control the encrypted data to be written to the memory device.

Further another embodiment of the present disclosure is a system including a host configured to allocate a portion of a memory provided therein as a host memory buffer capable of directly accessed by a memory controller, a memory device configured to store encrypted data and the memory controller configured to receive, from the host, a data write command to write data to the memory device, encrypt the data by using one of a plurality of keys stored in a key area within the host memory buffer that is provided in the host and is allocated to the memory controller itself in response to the data write command, and then controls the encrypted data to be written to the memory device.

Further another embodiment of the present disclosure is an operating method, of a controller, comprising decrypting, with a base key stored therein, an encrypted key to generate a plaintext key, the encrypted key being provided from a host, providing the host with a tag indicating the plaintext key and encrypting, in response to a write request provided together with plaintext data and the tag from the host, the plaintext data with the plaintext key to control a memory device to write therein the encrypted data.

The operating method further comprises decrypting, in response to a read request provided together with the tag from the host, the encrypted data with the plaintext key to provide the host with the decrypted data, the encrypted data being read from the memory device.

DETAILED DESCRIPTION

The features, advantages and methods for accomplishment of the present invention will be more apparent from referring to the following detailed embodiments described below as well as the accompanying drawings. However, the present invention is not limited to the embodiments disclosed below and is implemented in different and various forms. The embodiments bring about the complete disclosure of the present invention and are provided to make those skilled in the art fully understand the scope of the present invention. The present invention is just defined by the scope of the appended claims. The same reference numerals throughout this disclosure correspond to the same elements.

When one component is referred to as being "connected to" or "coupled to" another component includes both a case where one component is directly connected or coupled to another component and a case where a further another component is interposed between them. Furthermore, when one component is referred to as being "directly connected to" or "directly coupled to" another component indicates that a further another component is not interposed between them. The term "and/or" includes each of the mentioned items and one or more of all combinations thereof.

Terms used in the present specification are provided for description of only specific embodiments of the present invention, and not intended to be limiting. In the present specification, an expression of a singular form includes the expression of plural form thereof if not specifically stated. The terms "comprises" and/or "comprising" used in the specification are intended to specify characteristics, numbers, steps, operations, components, parts or any combination thereof which are mentioned in the specification, and are intended not to exclude the existence or addition of at least one of other characteristics, numbers, steps, operations, components, parts or any combination thereof.

While terms such as the first and the second, etc., can be used to describe various components, the components are not limited by the terms mentioned above. The terms are used only for distinguishing between one component and other components. Therefore, the first component to be described below may be the second component within the spirit of the present invention. Unless differently defined, all terms used herein including technical and scientific terms have the same meaning as commonly understood by one of ordinary skill in the art to which the present invention belongs. Also, commonly used terms defined in the dictionary should not be ideally or excessively construed as long as the terms are not clearly and specifically defined in the present application.

Hereinafter, embodiments of the present disclosure will be described in detail with reference to the accompanying drawings.

Figure 1:
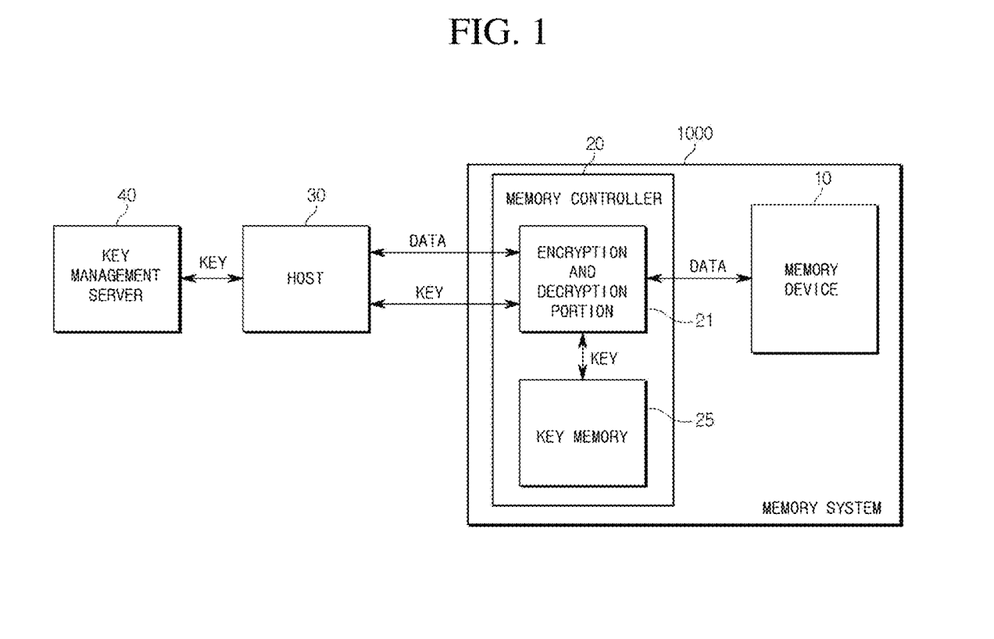
FIG. 1 is a view for describing a memory system that stores encrypted data according to an embodiment of the present disclosure.

FIG. 1 is a view for describing a memory system 1000 that stores encrypted data according to an embodiment of the present disclosure.

Referring to FIG. 1, the memory system 1000 may include a memory device 10, a memory controller 20 which controls an operation of the memory device, and a key memory 25 which stores a key used to encrypt data stored in the memory device 10. The memory system 1000 may store data under the control of a host 30 such as a mobile phone, a smart phone, an MP3 player, a laptop computer, a desktop computer, a game machine, a TV, a tablet PC, or an in-vehicle infotainment (IVI) system, etc.

The memory system 1000 may have various types according to a host interface method used for communication with the host 30, a configuration of the memory system, and the like. For example, the memory system 1000 may be a solid-state drive (SSD), a multimedia card (MMC), an embedded multimedia card (eMMC), an RS-MMC, a micro-MMC, secure digital (SD), mini-SD, micro-SD, a universal storage bus (USB), a universal flash storage (UFS), a personal computer memory card international association (PCMCIA), peripheral component interconnection (PCI), PCI express (PCI-E), compact flash (CF), smart media, or a memory stick.

The memory device 10 is a physical device for storing data, and may include a NAND flash memory, a vertical NAND flash memory, a NOR flash memory, and a resistive random-access memory (RRAM), a phase-change memory (PRAM), a magnetoresistive random-access memory (MRAM), a ferroelectric random-access memory (FRAM), a spin transfer torque random access memory (STT-RAM) and the like. In this specification, for convenience of description, the memory device 10 is a NAND flash memory.

The memory device 10 may operate in response to the control of the memory controller 20 and may include a plurality of memory cells capable of storing data.

The memory device 10 may receive a command and an address from the memory controller 20 and to access a region selected by the address in the memory cell array. That is, the memory device 10 may perform an operation directed by the command with respect to the region selected by the address. For example, the memory device 10 may perform a write operation (i.e., a program operation), a read operation, and an erase operation. During the write operation, the memory device 10 may store (program) data in the region selected by the address, During the read operation, the memory device 10 may read the data from the region selected by the address. During the erase operation, the memory device may erase the data stored in the region selected by the address.

The memory controller 20 may control the overall operation of the memory system 1000.

When power is applied to the memory system 1000, the memory controller 20 may execute firmware (FW). When the memory device 10 is a flash memory device, the memory controller 20 may execute firmware such as a flash translation layer (FTL) for data processing between the host and the memory device 10.

The memory controller 20 may control the memory device 10 to execute the program operation, the read operation, or the erase operation according to a request or command of the host 30.

During the write operation, the memory controller 20 may provide a write command, a physical block address, and data to the memory device 10. Here, data encrypted by an encryption and decryption portion 21 within the memory controller 20 may be supplied instead of plaintext data. The encryption and decryption portion 21 may encrypt data by using one of the keys stored in the key memory 25. According to the embodiment, when operating according to a Key per IO (KPIO) standard, the encryption and decryption portion 21 may encrypt data by using a different key for each input/output command, or for each write command. According to the embodiment, key to be used for encrypting data may be provided together with each write command by the host 30.

During the read operation, the memory controller 20 may provide a read command and the physical block address to the memory device 10. Here, the read data may be encrypted data. According to the embodiment. When the memory controller operates according to the KPIO standard, the read data may be data encrypted by using a different key for each read command. The encryption and decryption portion 21 of the memory controller 20 may decrypt the read encrypted data and convert it into plaintext. The memory controller 20 may transmit the data converted into plaintext to the host 30. According to the embodiment, key to be used to decrypt the read data may be provided together with each read command by the host 30.

During the erase operation, the memory controller 20 may provide an erase command and the physical block address to the memory device 10.

The memory controller 20 may generate a command, an address, and data of its own accord regardless of the request of the host 30 and transmit them to the memory device 10. For example, the memory controller 20 may provide a command, an address, and data to the memory device 10 in order to perform background operations such as a program operation for wear leveling and a program operation for garbage collection.

According to the currently proposed KPIO standard, the key memory should be a volatile memory, and the maximum size of the key memory may be 1 GB (giga byte). That is, the memory system 1000 needs to have a large-capacity volatile memory in order to implement the KPIO standard. This may increase the cost of the memory system 1000 and may require a large amount of time to find a key to be encrypted in a large-capacity volatile memory.

For the purpose of solving such concerns, the present disclosure proposes a method of using a host memory buffer (HMB).

Figure 2:
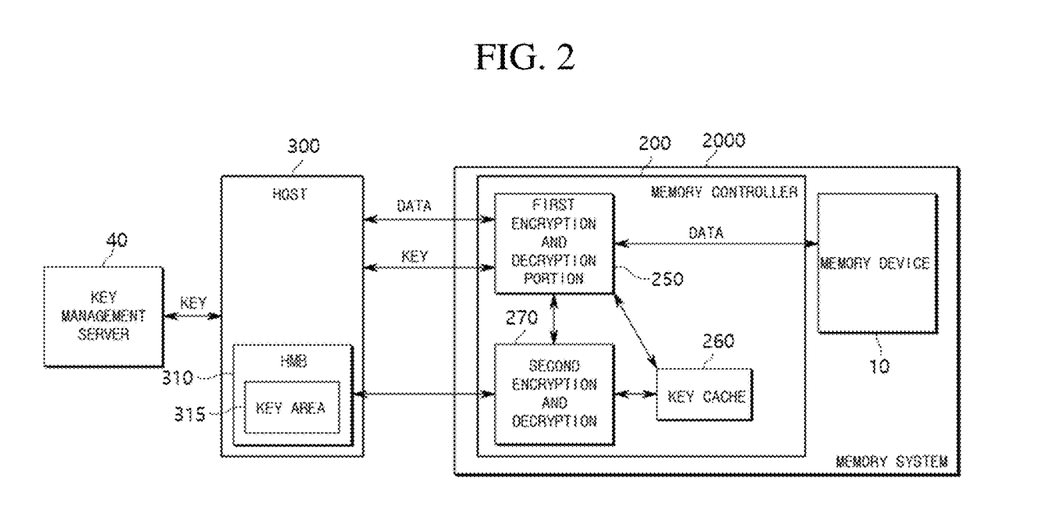
FIG. 2 is a view for describing a memory system for storing encrypted data according to various embodiments of the present disclosure.

FIG. 2 is a view for describing a memory system 2000 for storing encrypted data according to various embodiments of the present disclosure.

Referring to FIG. 2, unlike the structure of FIG. 1, the memory system 2000 does not include a key memory for storing a key used to encrypt data, and may store the key in a host memory buffer (HMB) 310 and use it. Also, a memory controller 200 of the memory system 2000 may further include a key cache (i.e., a key cache area) 270 in order to increase the speed of obtaining a key for encryption. The HMB 310 is an area existing within a volatile memory provided in the host 300. The HMB 310 may be an area allocated by the host 300 such that the memory system 2000 may use the area without the involvement of the host 300.

Also, referring to FIG. 2, the memory controller 200 may include at least two encryption and decryption portions. The first encryption and decryption portion 250 may perform the same function as that of the encryption and decryption portion 21 of FIG. 1, and the second encryption and decryption portion 260 may perform a function of encrypting the key which is stored in a key area 315 of the HMB 310 in consideration of a possibility that the key is leaked resulting from the fact that the key is stored in the HMB 310 that is an external device of the memory system 2000.

Although the example of FIG. 2 shows a plurality of data interfaces between the host 300 and the memory system 2000, the data interface is a logical interface, and there may be one actual physical data interface. For example, a PCIe interface may be used as the physical data interface.

The memory controller 200 of the memory system 2000 may perform not only the function related to the data encryption shown in FIG. 2 but also functions which are typically performed by a controller of the memory system. These functions have been briefly described above and have been already known. Therefore, additional descriptions thereof will be omitted.

Hereinafter, an operation in which the memory system 2000 encrypts data according to the KPIO standard and stores the data in the memory device 10 will be described in more detail.

Figure 3:
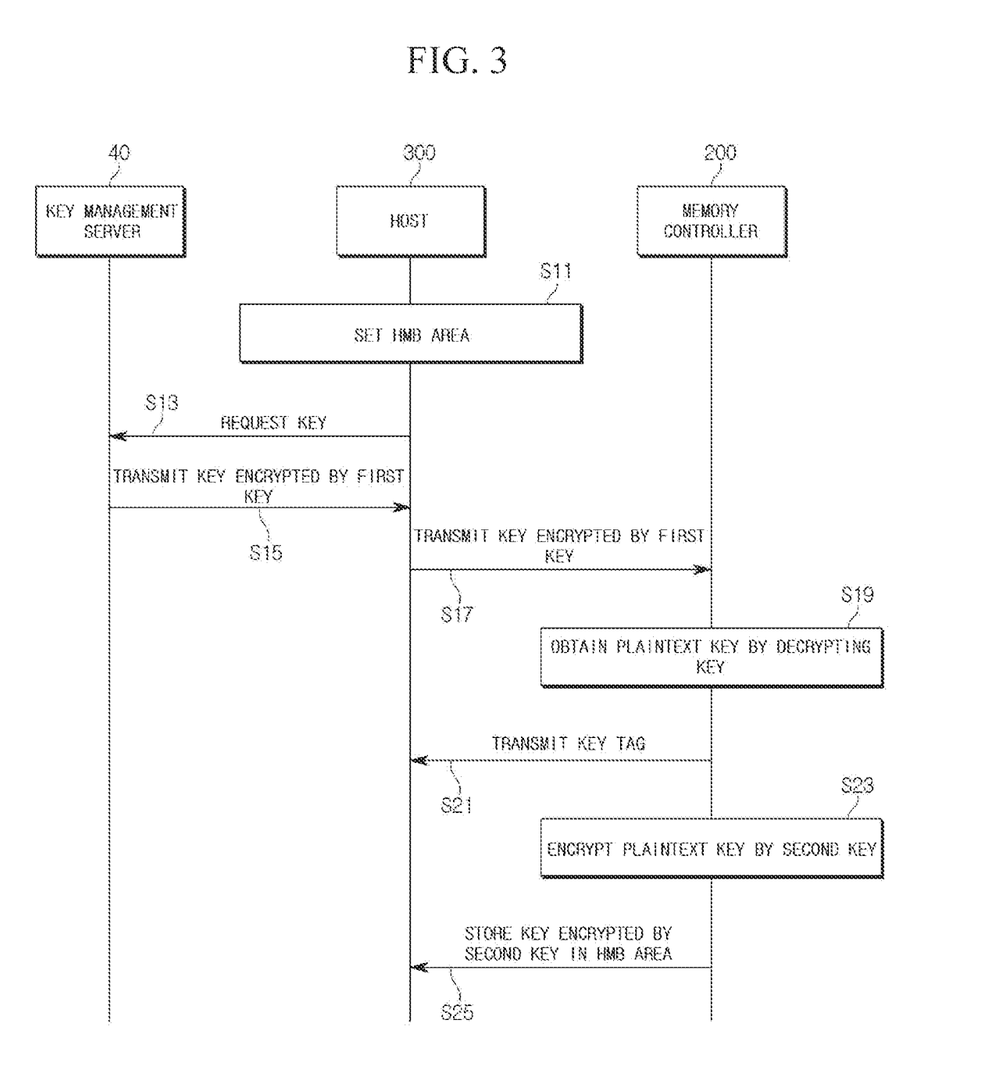
FIG. 3 is a flowchart for describing an operation in which a memory controller obtains a key required to encrypt data in accordance with various embodiments of the present disclosure.

FIG. 3 is a flowchart for describing an operation in which the memory controller 200 obtains a key required to encrypt data according to various embodiments of the present disclosure.

Referring to FIG. 3, in operation S11, the host 300 may set the NMB 310 to be used in the memory system 2000. The memory system 2000 may set a portion of the NMB 310 as the key area 315 for storing a key for encrypting data to be stored in the memory device 10.

In operation S13, the host 300 may request, from a key management server 40, a key that the memory system 2000 will use to encrypt data. According to the embodiment, the host 300 may additionally transmit an identifier of the memory system 2000.

In operation S15, the key management server 40 may generate and encrypt keys to be used by the memory system 2000, and may transmit the encrypted keys to the host 300. According to the embodiment, the key management server 40 may have a unique key encryption key (KEK) of the memory system 2000 and may encrypt the generated keys on the basis of the KEK. In addition, according to the embodiment, the encrypted keys may be transmitted in a field of value (V) within the format comprising fields of Tag, Type, Length, and Value (TTLV).

In operation S17, the host 300 may transfer the keys encrypted by a first key (e.g., KEK) from the key management server 40 to the memory controller 200 of the memory system 2000. Since the host 300 does not know the unique KEK of the memory system 2000, the host 300 may not be able to decrypt the encrypted data received from the key management server 40.

In operation S19, the memory controller 200 may decrypt the encrypted keys by using the first key and the first encryption and decryption portion 250, and then may obtain a plaintext key, the encrypted data being transferred from the host 300.

In operation S21, the memory controller 200 may transmit a key tag corresponding to each key to the host 300. Later, the host 300 transmits an I/O command or a write/read command together with a key tag and the memory controller 200 uses the key tag in order to retrieve a key for encrypting data which is to be written.

In operation S23, the memory controller 200 may generate encrypted keys by encrypting the obtained plaintext keys by a second key different from the first key by using the second encryption and decryption portion 260. In operation S25, the memory controller 200 may store the keys encrypted by the second key in the key area 315 within the HMB 310.

According to another embodiment, the memory controller 200 may encrypt keys to be stored in the NMB 310 by using the second key which is the same as the first key. In this case, both the first key and the second key may be KEK.

According to the embodiment, the first encryption and decryption portion 250 and the second encryption and decryption portion 260 may perform encryption and decryption in different ways. According to another embodiment, the first encryption and decryption portion 250 and the second encryption and decryption portion 260 may perform encryption and decryption in the same manner. In this case, one encryption and decryption portion may be implemented to operate in such a way as to use different keys.

According to the embodiment, the first encryption and decryption portion 250 and the second encryption and decryption portion 260 may operate based on an advanced encryption standard (AES) encryption algorithm. The AES encryption algorithm may be a symmetric key algorithm that uses the same key during the encryption and decryption process. When using the AES encryption algorithm, the length of the key used for encryption may be 128 bits, 192 bits, or 256 bits.

When the plaintext key is stored in the volatile memory within the memory controller, the re-encryption operation of operation S23 may not be required. However, as proposed in the present disclosure, when keys are stored in the HMB 310 of the host 300, there is a possibility that the keys are exposed to the outside and detected through the interface between the host 300 and the memory controller 200, so that encryption may be required.

According to another embodiment, when the memory controller 200 obtains keys encrypted by the first key from the key management server through the host 300, the keys may be stored directly in the HMB 310 without the decryption of operation S19 and the encryption of operation S23. In this case, the keys stored in the HMB 310 may be the same as that encrypted by the first key.

According to the operation shown in FIG. 3 above, the memory controller 200 may store, in the HMB 310 of the host 300 not in an internal memory, keys to be used when writing or reading data to or from the memory device 10 and may use the keys.

Since there may be a time delay to some extent for the memory controller 200 to bring the keys stored in the HMB 310 of the host 300, the memory controller 200 may include the key cache 270 that stores therein some keys that is highly likely to be used among all keys in order to increase the processing speed. Also, according to the embodiment, after obtaining the plaintext key in operation S19, the memory controller 200 may perform an operation of storing some keys in the key cache 270.

Figure 4:
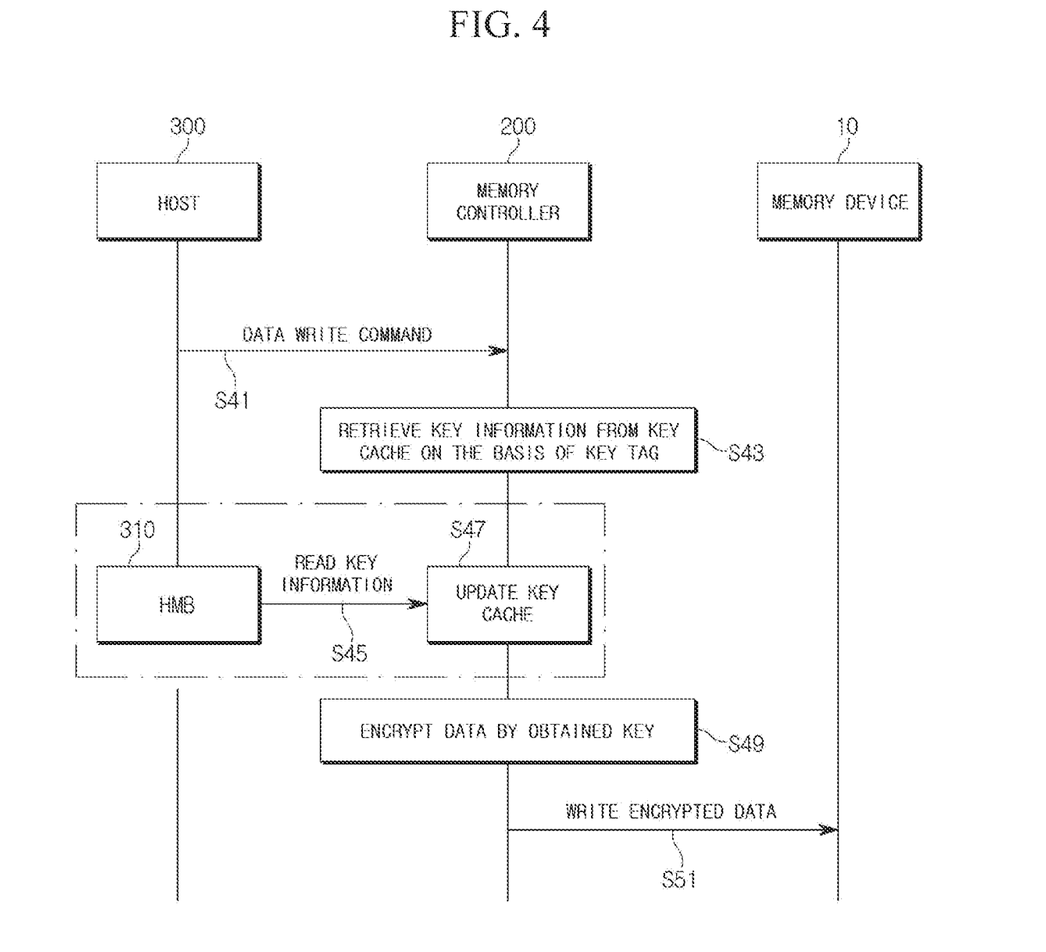
FIG. 4 is a flowchart for describing an operation of writing encrypted data to a memory device in accordance with various embodiments of the present disclosure.

FIG. 4 is a flowchart for describing an operation of writing encrypted data to the memory device 10 in accordance with various embodiments of the present disclosure.

Referring to FIG. 4, in operation S41, the host 300 may transmit a data write command to the memory device 10 to the memory controller 200. According to the embodiment, by the host 300, a key tag corresponding to a key to be used to encrypt data to be written may be included in the data write command and may be transmitted to the memory controller 200.

In operation S43, the memory controller 200 may retrieve a key from the key cache 270 on the basis of the key tag obtained from the host 300. As a result of the retrieval, when the key is obtained, the memory controller 200 may encrypt, by the obtained key, the data to be written, in operation S49.

Also, in operation S51, the memory controller 200 may write the encrypted data to the memory device 10.

In operation S43, when the key corresponding to the provided key tag is not retrieved from the key cache 270, the memory controller 200 reads the key from the HMB 310 of the host 300 in operation S45, and may update the key cache 270 in operation S47. According to the embodiment, first, the memory controller 200 may obtain, from the HMB 310, only a key corresponding to the obtained key tag, and then may encrypt the data by the obtained key in operation S49, and may write the encrypted data to the memory device 10 in operation S51. Additionally, the memory controller 200 may perform the operation of reading keys from the HMB 310 of operation S45 and the operation of updating the key cache 270 of operation S47 simultaneously with or after performing operations S49 and S51, According to the embodiment, when failing to obtain a key from the key cache 270 on the basis of the key tag, the memory controller 200 may perform the operation of updating the key cache 270. Here, the operation of updating the key cache is not performed with being limited to this case and may be performed by other triggers. According to the embodiment, the memory controller 200 may perform the key cache update operation on the basis of a request of the host 300, or may perform the key cache update operation on the basis of a predetermined time period.

The key cache update operation may be variously performed based on a key cache update policy and a key usage policy. According to the embodiment, in the key cache update operation, keys to be stored in the key cache may be selected according to a least recently used (LRU) algorithm.

Figure 5:
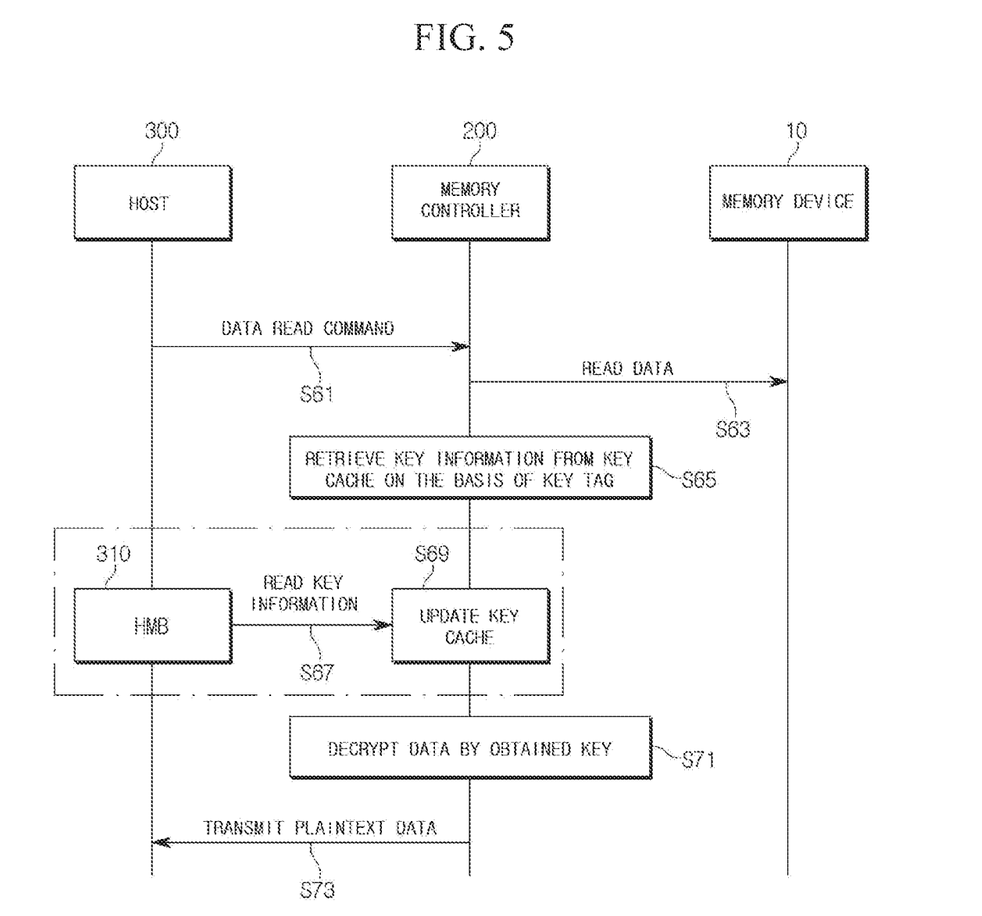
FIG. 5 is a flowchart for describing an operation of reading the encrypted data from the memory device in accordance with various embodiments of the present disclosure.

FIG. 5 is a flowchart for describing an operation of reading the encrypted data from the memory device 10 in accordance with various embodiments of the present disclosure.

Referring to FIG. 5, in operation S61, the host 300 may transmit a data read command stored in the memory device 10 to the memory controller 200, According to the embodiment, by the host 300, a key tag corresponding to a key to be used to decrypt the read data may be included in the data read command and may be transmitted to the memory controller 200.

In operation S63, the memory controller 200 may control the memory device 10 and read the data requested by the host from the memory device 10. Here, the data may be encrypted data.

In operation S65, the memory controller 200 may retrieve a key from the key cache 270 on the basis of the key tag obtained from the host 300.

In operation S65, when a key is not retrieved from the key cache 270, the memory controller 200 may read the key from the HMB 310 of the host 300 in operation S67 and may update the key cache 270 in operation S69. According to the embodiment, first, the memory controller 200 may only obtain, from the HMB 310, a key corresponding to the obtained key tag.

Operations S65 to S69 above may be performed simultaneously with operation S63.

If the data reading from the memory device 10 is completed and a key is obtained in the previous operation, the memory controller 200 may decrypt the data by the obtained key and may obtain plaintext data in operation S71, and the memory controller 200 may transmit the plaintext data to the host 300 and may complete the response to the read command in operation S73.

Additionally, independently of other operations, the memory controller 200 may perform the operation of reading keys from the HMB 310 of operation S67 and the operation of updating the key cache 270 of operation S69, According to the embodiment, when failing to obtain a key from the key cache 270 on the basis of the key tag, the memory controller 200 may perform the operation of updating the key cache 270. According to the embodiment, the memory controller 200 may perform the operation of updating the key cache on the basis of a request of the host 300, or may perform the operation of updating the key cache on the basis of a predetermined time period.

Figure 6:
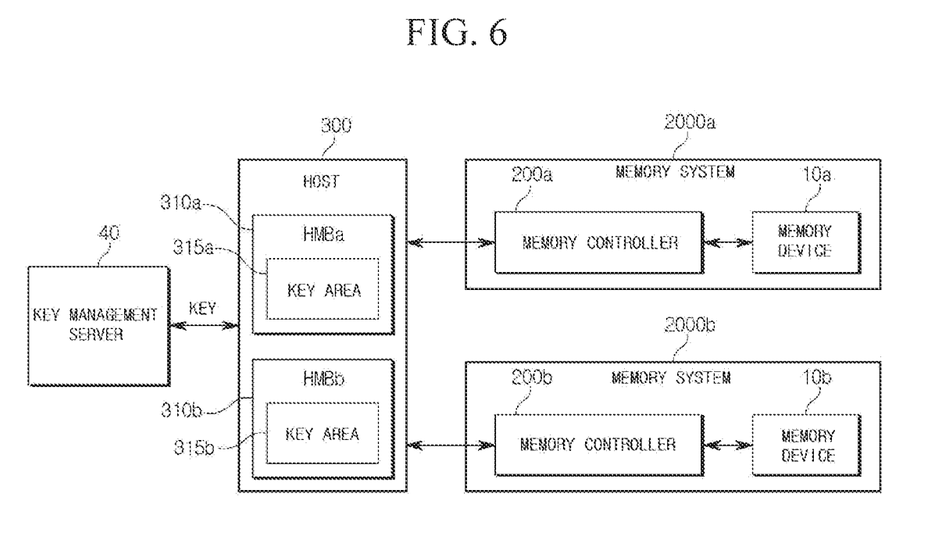
FIG. 6 is a view for describing a system including a plurality of memory systems for storing the encrypted data in accordance with various embodiments of the present disclosure.

FIG. 6 is a view for describing a system including a plurality of memory systems for storing the encrypted data in accordance with various embodiments of the present disclosure.

Referring to FIG. 6, a plurality of memory systems for storing encrypted data may be connected to the host 300.

In this structure, the host 300 may individually allocate a portion of the memory buffer to the memory systems respectively, so that the portion may be used as the host memory buffer 310a and 310b of each of the memory systems 2000a and 2000b. In addition, each of the memory systems 2000a and 2000b may allocate a portion of the host memory buffer allocated to itself as a key area 315a and 315b for storing the key.

Then, the memory systems 2000a and 2000b may obtain their keys according to the flowchart shown in FIG. 3 respectively and may store the keys in key areas 315a and 315b allocated to their host memory buffers 310a and 310b.

Also, the memory controllers 200a and 200b of the memory systems 2000a and 2000b may write the encrypted data to the memory devices 10a and 10b within the memory systems respectively in accordance with the flowcharts shown in FIGS. 4 and 5 and may decrypt the encrypted data read from the memory devices 10a and 10b and may transmit it to the host 300.

Figure 7:
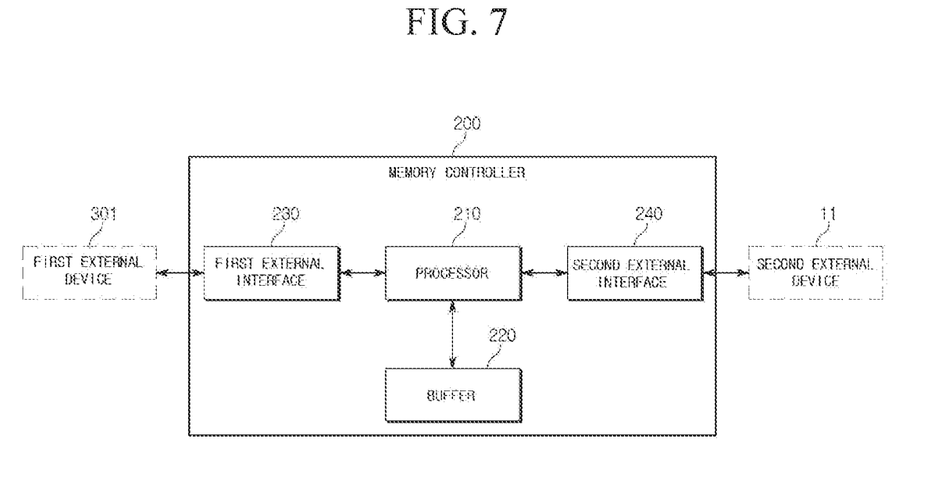
FIG. 7 is a view showing a configuration of a memory controller 200 according to various embodiments of the present disclosure.

FIG. 7 is a view showing a configuration of the memory controller 200 according to various embodiments of the present disclosure.

Referring to FIG. 7, the memory controller 200 may include a processor 210, a buffer 220, a first external interface 230, and a second external interface 240.

The first external interface 230 may be configured to communicate with a first external device (e.g., host) 301 under the control of the processor 210. The first external interface 230 may be configured to communicate with the first external device 301 by using at least one of various communication standards or interfaces such as a USB, a serial AT attachment (SATA), a serial attached SCSI (SAS), a high speed interchip (HSIC), a small computer system interface (SCSI), a peripheral component interconnection (PCI), PCI express (PCIe), non-volatile memory express (NVMe), a universal flash storage (UPS), SD, MMC, eMMC, a dual in-line memory module (DIMM), a registered DIMM (RDIMM), a Load Reduced DIMM (LRDIMM), etc.

According to the embodiment, when a controller (e.g., NVMe controller) for the first external interface 230 is provided, the controller may be provided in the form of an IP core in such a way as to be included together with an IP core performing other functions of the processor 210 in one integrated chip (IC), or may be implemented as an independent IC and be provided between the first external interface 230 and the processor 210. In addition, the controller may control data transmission and reception with the first external device on the basis of a first external interface protocol.

The second external interface 240 may be configured to communicate with a second external device (e.g., memory device) 11 under the control of the processor 210. The second external interface 240 may provide a control signal, an address, and/or data to the second external device 11 and receive data from the second external device 11 on the basis of interface methods supported by the second external device 11.

The buffer 220 may be used as an operating memory, a cache memory, or a buffer memory of the processor 210. The buffer 220 may store codes and commands executed by the processor 210. The buffer 220 may temporarily store data processed by the processor 210. The buffer 220 can be accessed only by an encryption decryption module within the processor 210, and may have a key cache area for storing keys used to encrypt data to be stored in the second external 11. The buffer 220 may include a static RAM (SRAM) and/or a dynamic RAM (DRAM).

The processor 210 may control all operations of the memory controller 200 and may perform logical operations. The processor 210 may communicate with the first external device (e.g., the host) 301 through the first external interface 230, and may communicate with the second external device (e.g., the memory device) 11 through the second external interface 240. In addition, the processor 210 may store temporary data required for controlling the operation of the memory system 2000 in the buffer 220.

The processor 210 may perform a function of a flash translation layer. According to an embodiment, the processor 210 may control the operation of the memory controller 200 by using program codes in which the functions of the flash translation layer are implemented. When power is applied, the processor 210 may read and execute corresponding codes from a non-volatile memory device (e.g., a read only memory) provided within the memory controller 200. In another embodiment, the processor 210 may read and execute program codes in which the function of the flash translation layer is implemented from the second external device 11 through the second external interface 240, Even in this case, the minimum firmware code for executing the second external interface 240 may be read from the non-volatile memory device provided within the memory controller 200.

Also, the processor 210 may perform an encryption and decryption function of encrypting data to be written to the second external device 11 and of decrypting the encrypted data read from the second external device 11. According to the embodiment, the processor 210 may perform a plurality of encryption and decryption functions in order to increase data processing speed or in order to use different encryption algorithms.

According to the embodiment, the processor 210 may be implemented by a plurality of ICs. That is, the processor 210 may be configured by a plurality of ICs, each of which is implemented to perform a function given thereto.

As described above, according to the embodiment of the present disclosure, the HMB is used in order to store an encryption key according to the KPIO standard, so that there is no need to provide a large-capacity volatile memory within the memory system.

According to various embodiments of the present disclosure, it is possible to implement a nonvolatile memory system that does not require a large-capacity volatile memory that stores an encryption key according to the KPIO standard.

In addition, according to various embodiments of the present disclosure, it is possible to efficiently manage the encryption key according to the KPIO standard in the non-volatile memory system that is not equipped with a large-capacity volatile memory.

Advantageous effects that can be obtained from the present disclosure are not limited to the above-mentioned effects. Further, other unmentioned effects can be dearly understood from the following descriptions by those skilled in the art to which the present disclosure belongs.

What is claimed is:

1. A memory controller comprising:
   a first interface configured to perform data communication with a first external device comprising a host memory buffer being a portion of a volatile memory provided in the first external device;
   a second interface configured to generate signal for controlling an operation of a second external device and transmit the signal; and
   a processor configured to:
   receive keys from the first external device,
   encrypt the keys by an encryption key of the memory controller,
   store the encrypted keys in a key area provided in the host memory buffer,
   receive, from the first external device, a data write command to write data to the second external device,
   read one of the encrypted keys stored in the key area,
   encrypt, in response to the data write command, the data by using the read key, and
   control the encrypted data to be written to the second external device.

2. The memory controller of claim 1, further comprising a buffer comprising a key cache area in which one or more keys are stored, the one or more keys being from the plurality of keys stored in the key area.

3. The memory controller of claim 2, wherein the processor is further configured to:
   retrieve, from the key cache area, a key corresponding to a key tag included in the data write command, and
   retrieve, from the key area, the key corresponding to the key tag included in the data write command when failing to retrieve, from the key cache area, the key corresponding to the key tag included in the data write command.

4. The memory controller of claim 3, wherein the processor is further configured to:
   receive a data read command from the first external device,
   read encrypted data from the second external device in response to the data read command,
   generate plaintext data by decrypting the encrypted data by using one of the plurality of keys stored in one of the key cache area and the key area, and
   transmit the plaintext data to the first external device.

5. The memory controller of claim 4, wherein the processor is further configured to:
   retrieve, from the key cache area, a key corresponding to a key tag included in the data read command, and
   retrieve, from the key area, the key corresponding to the key tag included in the data read command when failing to retrieve, from the key cache area, the key corresponding to the key tag included in the data read command.

6. The memory controller of claim 1, wherein the processor is further configured to:
   obtain, through the first external device, keys generated and transmitted by a key management server,
   obtain plaintext keys by decrypting the keys received from the key management server by using a unique key encryption key of the memory controller,
   encrypt the plaintext keys by using a second key, and
   store the encrypted keys in the key area provided in the first external device.

7. The memory controller of claim 1, wherein the processor is further configured to encrypt the data which is written at the second external device in response to the data write command, by using a different key for each data write command.

8. A memory system comprising:
   a memory device configured to store data; and
   a memory controller configured to:
   receive keys from a first external device,
   encrypt the keys by an encryption key of the memory controller,
   store the encrypted keys in a key area provided in a host memory buffer being a portion of the first external device,
   receive, from the first external device, a data write command to write data to the memory device,
   read one of the encrypted keys stored in the key area,
   encrypt, in response to the data write command, the data by using the read key, and
   control the encrypted data to be written to the memory device.

9. The memory system of claim 8,
   wherein the memory controller is further configured to:
   read a portion of the plurality of keys stored in the key area, and
   store the read keys in a key cache area within the memory controller.

10. The memory system of claim 9,
    wherein the memory controller is further configured to:
    retrieve, from the key cache area, a key corresponding to a key tag included in the data write command, and
    retrieve, from the key area, the key corresponding to the key tag included in the data write command when failing to retrieve, from the key cache area, the key corresponding to the key tag included in the data write command.

11. The memory system of claim 10, wherein the memory controller is further configured to:
    receive a data read command from the first external device,
    read encrypted data from the memory device in response to the data read command,
    generate plaintext data by decrypting the encrypted data by using one of the plurality of keys stored in one of the key cache area and the key area, and
    transmit the plaintext data to the first external device.

12. The memory system of claim 11, wherein the memory controller is further configured to:
    retrieve, from the key cache area, a key corresponding to a key tag included in the data read command, and
    retrieve, from the key area, the key corresponding to the key tag included in the data read command when failing to retrieve, from the key cache area, the key corresponding to the key tag included in the data read command.

13. The memory system of claim 8, wherein the memory controller is further configured to:
obtain, through the first external device, keys generated and transmitted by a key management server,
encrypt the keys by using a unique key encryption key of the memory controller, and
store the encrypted keys in the key area.

14. The memory system of claim 8, wherein the memory controller is further configured to encrypt the data, which is written at the memory device in response to the data write command, by using a different key for each data write command.

15. A system comprising:
a host configured to allocate a portion of a volatile memory provided therein as a host memory buffer capable of directly accessed by a memory controller;
a memory device configured to store encrypted data; and
the memory controller configured to:
receive keys from the host,
encrypt the keys by an encryption key of the memory controller,
store the encrypted keys in a key area provided in the host memory buffer,
receive, from the host, a data write command to write data to the memory device,
read one of the encrypted keys stored in the key area,
encrypt, in response to the data write command, the data by using the read key, and
control the encrypted data to be written to the memory device.

16. The system of claim 15, wherein the memory controller is further configured to:
read a portion of the plurality of keys stored in the key area, and
store the read keys in a key cache area within the memory controller.

17. The system of claim 16, wherein the memory controller is further configured to:
retrieve, from the key cache area, a key corresponding to a key tag included in the data write command, and
retrieve, from the key area, the key corresponding to the key tag included in the data write command when failing to retrieve, from the key cache area, the key corresponding to the key tag included in the data write command.

18. The system of claim 17,
wherein the host is further configured to transmit a data read command to the memory controller, and
wherein the memory controller is further configured to:
receive a data read command from the host,
read encrypted data from the memory device in response to the data read command,
generate plaintext data by decrypting the encrypted data by using one of the plurality of keys stored in one of the key cache area and the key area, and
transmit the plaintext data to the host.

19. The system of claim 18, wherein the memory controller is further configured to:
retrieve, from the key cache area, a key corresponding to a key tag included in the data read command, and
retrieve, from the key area, the key corresponding to the key tag included in the data read command when failing to retrieve, from the key cache area, the key corresponding to the key tag included in the data read command.

20. The system of claim 15,
wherein the host is further configured to:
request, from a key management server, keys for the memory controller to encrypt data,
receive the keys from the key management server, and
transmit the received keys to the memory controller, and
wherein the memory controller is further configured to:
obtain the keys from the host,
encrypt the keys by using a unique key encryption key of the memory controller, and
store the encrypted keys in the key area.

* * * * *